July 24, 1934.  A. BULLMER  1,967,705
OIL RESERVOIR FOR BEARINGS
Filed Feb. 4, 1932
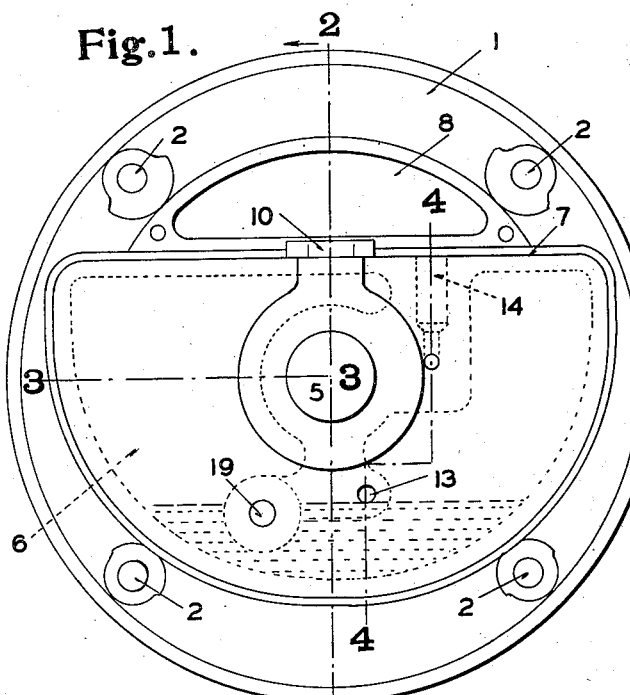
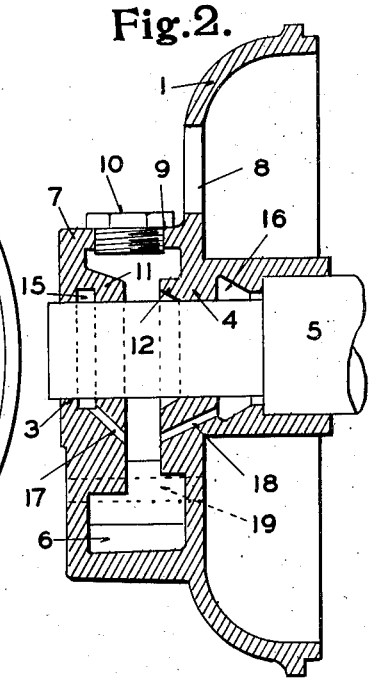
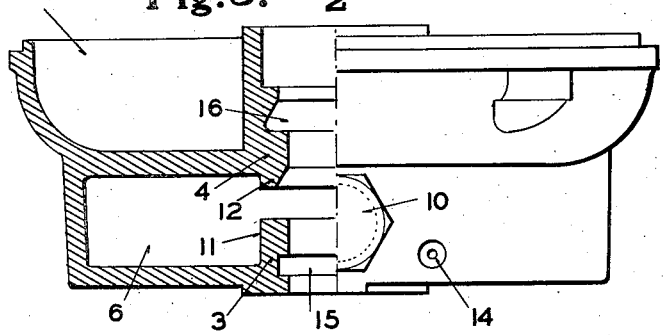
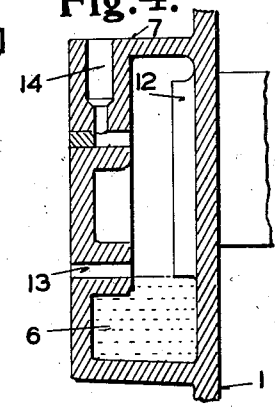
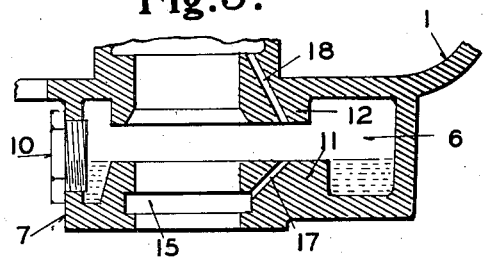
Inventor
A. BULLMER
By
Att'y.

Patented July 24, 1934

1,967,705

UNITED STATES PATENT OFFICE 1,967,705

OIL RESERVOIR FOR BEARINGS

Andrew Bullmer, St. Louis, Mo., assignor to Wagner Electric Corporation, St. Louis, Mo., a corporation of Delaware Application February 4, 1932, Serial No. 590,823

5 Claims. (Cl. 308—134)

My invention relates to oil reservoirs for shaft bearings in which the oil is conveyed to the shaft by some type of wick (such as yarn or waste), or by an oil ring.

In prior constructions known to me, no provision has been made for preventing the oil in the reservoir from leaking out between the bearing and the shaft when the machine of which it is a part, is in a position other than the normal one, as is often the case during shipment. In view of this, the usual procedure of the manufacturer has been to fill the reservoir with oil during testing of the machine but to drain the oil before shipment. However, users often neglect to refill the reservoir and the principal object of my invention is to so construct an oil reservoir that the oil will not leak out in any position in which the machine may be placed and thus permit shipment of the machine with the proper supply of oil in the reservoir.

Other objects of my invention will become apparent from the following description taken in connection with the accompanying drawing in which Figure 1 is an end view of an end plate of a dynamo electric machine embodying shaft bearing bosses and my improved oil reservoir therefor in their normal positions; Figure 2 is a cross sectional view on the line 2—2 of Figure 1; Figure 3 is a top view of Figure 1, partly in cross section, the cross section being on the line 3—3; Figure 4 is a cross sectional view on the line 4—4 of Figure 1; and Figure 5 is a cross sectional view of the bearing bosses and the oil reservoir, showing the position the body of oil assumes when the shaft bearing axis is vertical.

Referring to the drawing in detail, 1 indicates the end plate of a dynamo electric machine provided with suitable holes 2 for attachment to the machine casing. The spaced apart bearing bosses 3 and 4 for the end of the shaft 3 are integral with the end plate and are surrounded by the oil reservoir 6, also integral with the end plate. The oil reservoir is of the large capacity type having a flat top 7 extending over the major width of the end plate, as shown, so as to allow access to the opening 8 in the end plate for inspecting the machine. The top wall is also provided with a suitable opening 9 for inserting the yarn or waste, the opening being closed by the plug 10. If an oil ring were used the opening 9 would, of course, have to be sufficiently large to permit the insertion of the ring.

In accordance with my invention I provide the bearing bosses 3 and 4 with circumferential flanges 11 and 12 extending toward each other along the shaft 5, thereby forming means for preventing oil from leaking between the bearing bosses and the shaft when the axis of the bearing assumes a vertical position. The necessary height of the flanges 11 and 12, to prevent this leakage, is dependent upon the amount of oil in the reservoir and the amount of space that surrounds each flange. To prevent an excess of oil from being placed in the reservoir, an overflow hole 13 is provided in the lower part of the reservoir which will determine the oil line when the reservoir is in normal position, as shown in Figures 1 and 4. To prevent oil from flowing out of the hole 13 when the axis of the bearing bosses is in a vertical position, the flange 11 is of such thickness that the hole may enter the reservoir through the inner edge of the flange, as clearly shown in Figure 4. An oil hole 14 is also provided in the top of the reservoir for adding oil to the reservoir when necessary, this hole also entering the reservoir through the inner edge of the flange 11.

From the above described structure it is clearly seen that by correctly proportioning the size of the reservoir, the height of the flanges, and the location of the overflow hole 13, it will be impossible for any oil to leak out of the reservoir in any position of the machine. If, for example, the axis of the bearings should assume a vertical position, the oil will be confined to the space in the reservoir surrounding the flange 11 or that surrounding the flange 12, the capacity of each of these spaces being slightly larger than the volume of oil in the reservoir. The position assumed by the body of oil in one of the vertical positions, is clearly shown in Figure 5. If the machine assumes a position wherein the top 7 of the reservoir is interchanged with the bottom, then the oil in the reservoir will be contained in the space between the flanges and the top 7 and below the shaft. If the machine assumes a position on either of its sides, the capacity of the oil reservoir on each side of the bearings is sufficient to contain the entire supply of oil. Thus the level of oil in the reservoir will not, in any position of the machine, be such as to permit the oil to leak out along the shaft or through the oil hole 14.

The bearings 3 and 4 are shown with the usual grooves 15 and 16 for collecting the oil conveyed to the shaft and passing through the bearings in the normal operation of the machine, they being connected by drain-back conduits 17 and 18 which enter the reservoir through the edges of the flanges. The end plate may also be provided with an opening 19 passing through the reservoir but not connected therewith, when such opening is required for the passage of a brush adjusting screw or other part of the machine which is desired to be accessible from the exterior. Where it is possible to eliminate the opening 8 in the end plate, the reservoir may be made more circular in shape if desired, it only being necessary that the capacity of the space between the top of the reservoir and the flanges of the bearing bosses be greater than the volume of oil in the reservoir.

From the foregoing description it will be apparent that by the use of my novel structure, a manufacturer may supply the reservoir with the necessary amount of oil before shipment.

Having fully described my invention, what I claim as new and desire to secure by Letters Patent of the United States is:

1. The combination of a shaft bearing housing, a lubricant reservoir therefor adapted to maintain a body of fluid lubricant beneath and adjacent the bearing when the shaft axis is in a horizontal position, and an annular flange carried by said bearing housing and extending into the reservoir along said shaft for preventing the lubricant from contacting with the shaft when the shaft assumes a vertical position, the wall of the reservoir and said flange being provided with an oil receiving opening and an overflow opening both of which communicate with the reservoir through the inner end of the flange and said overflow being below the shaft when the housing is in normal position.

2. The combination with a shaft bearing, of a lubricant reservoir therefor, said reservoir being provided with an overflow opening for maintaining the level of the fluid lubricant below the bearing when the shaft axis is in a horizontal position and the reservoir is in normal position, said reservoir also being provided with an annular portion extending into the reservoir along the shaft for preventing the lubricant from contacting with the shaft when the shaft is in one of its vertical positions and said overflow opening communicating with the reservoir through the inner end of said annular portion.

3. The combination with a shaft bearing member provided with an oil collecting groove, of a lubricant reservoir adapted to maintain a body of fluid lubricant beneath and adjacent the bearing member when the shaft axis is in a horizontal position, said reservoir also comprising a lubricant containing space adapted to receive and retain the lubricant in a position out of contact with the shaft when the shaft is in one of its vertical positions, and said bearing member being provided with a drain back conduit connecting its oil collecting groove with the reservoir, the conduit entering the reservoir above the body of lubricant in any position of the shaft.

4. The combination with a shaft of a one-piece bearing housing provided with shaft openings therethrough and an interior lubricant containing space surrounding the shaft, said housing having annular extensions on its inner walls adjacent said shaft openings and embracing the shaft and an overflow passage in the housing wall and one of the annular extensions and communicating with the lubricant space through the inner end of said extension, said overflow passage also being below the shaft when the housing is in normal position.

5. The combination with a shaft of a one-piece bearing housing provided with shaft openings therethrough and an interior lubricant containing space surrounding the shaft, said housing having an annular extension on one of its inner walls adjacent the shaft opening and embracing the shaft, and an oil supply passage in the housing wall and the annular extension and communicating with the lubricant space through the inner end of said extension, the external end of the oil supply passage being at the top of the housing when the bearing is in its normal position.

ANDREW BULLMER.